United States Patent
Martini

(10) Patent No.: US 11,064,015 B2
(45) Date of Patent: Jul. 13, 2021

(54) HYBRID CLOUD COMPUTING NETWORK MANAGEMENT

(71) Applicant: iboss, Inc., Boston, MA (US)

(72) Inventor: Paul Michael Martini, Boston, MA (US)

(73) Assignee: iboss, Inc., Boston, MA (US)

( * ) Notice: Subject to any disclaimer, the term of this patent is extended or adjusted under 35 U.S.C. 154(b) by 0 days.

(21) Appl. No.: 16/388,551

(22) Filed: Apr. 18, 2019

(65) Prior Publication Data

US 2019/0327293 A1 Oct. 24, 2019

Related U.S. Application Data

(60) Provisional application No. 62/659,644, filed on Apr. 18, 2018.

(51) Int. Cl.
| | | |
|---|---|---|
| *H04L 29/08* | (2006.01) | |
| *H04L 12/24* | (2006.01) | |
| *H04L 12/26* | (2006.01) | |
| *H04L 29/06* | (2006.01) | |

(52) U.S. Cl.
CPC .......... *H04L 67/10* (2013.01); *H04L 41/0803* (2013.01); *H04L 41/0893* (2013.01); *H04L 43/0817* (2013.01); *H04L 63/1425* (2013.01); *H04L 67/1095* (2013.01)

(58) Field of Classification Search
CPC . H04L 67/10; H04L 41/0803; H04L 67/1095; H04L 63/1425; H04L 43/0817; H04L 41/0893; G06F 9/547; G06F 9/45558; G06F 2009/45595

See application file for complete search history.

(56) References Cited

U.S. PATENT DOCUMENTS 8,214,905 B1 * 7/2012 Doukhvalov ......... G06F 21/577
   726/24
8,572,602 B1 * 10/2013 Colton .................. G06F 16/958
   717/177

(Continued)

OTHER PUBLICATIONS

Young, International Search Report/Written Opinion in corresponding PCT Application No. PCT/US19/28173 dated Jul. 18, 2019, 17 pages.

*Primary Examiner* — Lance Leonard Barry
(74) *Attorney, Agent, or Firm* — Fish & Richardson P.C.

(57) ABSTRACT

Techniques for delivering a distributed network security service providing isolation of customer data are described. One example method includes configuring a first node to participate in a node cluster, wherein the first node is hosted by a first cloud service provider, and wherein participating in the node cluster includes performing one or more processing actions specific to the node cluster on data received by the node; configuring a second node to participate in the node cluster, the second node hosted by a second cloud service provider; receiving a status indication from the first node over a network; determining a synchronization mechanism for the first node based on a network configuration of the first node, wherein the determined synchronization mechanism is configured to allow the first node to acquire synchronization data from other nodes in the node cluster; and transmitting the synchronization mechanism to the first node over the network.

17 Claims, 5 Drawing Sheets

(56) References Cited

U.S. PATENT DOCUMENTS

| | | | |
|---|---|---|---|
| 9,026,658 B2* | 5/2015 | Xu | G06F 9/5027 |
| | | | 709/202 |
| 9,507,540 B1* | 11/2016 | Adogla | G06F 9/45558 |
| 2011/0238515 A1* | 9/2011 | Diwakar | G06F 9/5072 |
| | | | 705/26.1 |
| 2014/0081989 A1* | 3/2014 | Chang | G06F 11/2058 |
| | | | 707/748 |
| 2014/0365811 A1* | 12/2014 | Veiga | G06F 11/1425 |
| | | | 714/4.11 |
| 2015/0101021 A1 | 4/2015 | Mc Erlean et al. | |
| 2016/0164886 A1* | 6/2016 | Thrash | H04L 63/14 |
| | | | 726/23 |
| 2017/0026468 A1* | 1/2017 | Kumar | H04L 69/28 |
| 2017/0222743 A1 | 8/2017 | Ruffini et al. | |

* cited by examiner

HYBRID CLOUD COMPUTING NETWORK MANAGEMENT

CROSS-REFERENCE TO RELATED APPLICATIONS

This application claims priority to U.S. Provisional Application Ser. No. 62/659,644 filed Apr. 18, 2018.

BACKGROUND

A computer network is a collection of computers and other hardware interconnected by communication channels that allow sharing of resources and information. Communication protocols define the rules and data formats for exchanging information in a computer network.

Distributed computing involves multiple computing devices organized to cooperatively perform a particular application. For example, a computationally expensive task may be split into subtasks to be performed in parallel by the computing devices in the distributed network, allowing the task to be completed faster. Distributing computing may also involve fragmenting a data set and storing it across multiple storage devices. Distributed computing may also involve the multiple computing devices handling individual requests from clients, such as requests for data received over the Internet. Providing computing services over the Internet using such a distributed approach is generally referred to as "cloud computing."

SUMMARY

Techniques for implementing and managing a hybrid cloud computing network including virtual and physical nodes distributed across multiple cloud service providers and different networks are described. One example method includes configuring a first node to participate in a node cluster, wherein the first node is hosted by a first cloud service provider, and wherein participating in the node cluster includes performing one or more processing actions specific to the node cluster on data received by the node; configuring a second node to participate in the node cluster, the second node hosted by a second cloud service provider; receiving a status indication from the first node over a network; determining a synchronization mechanism for the first node based on a network configuration of the first node, wherein the determined synchronization mechanism is configured to allow the first node to acquire synchronization data from other nodes in the node duster; and transmitting the synchronization mechanism to the first node over the network.

Other features, aspects and potential advantages will be apparent from the accompanying description and figures.

DESCRIPTION OF DRAWINGS

Like reference symbols in the various drawings indicate like elements.

DETAILED DESCRIPTION

Figure 1:
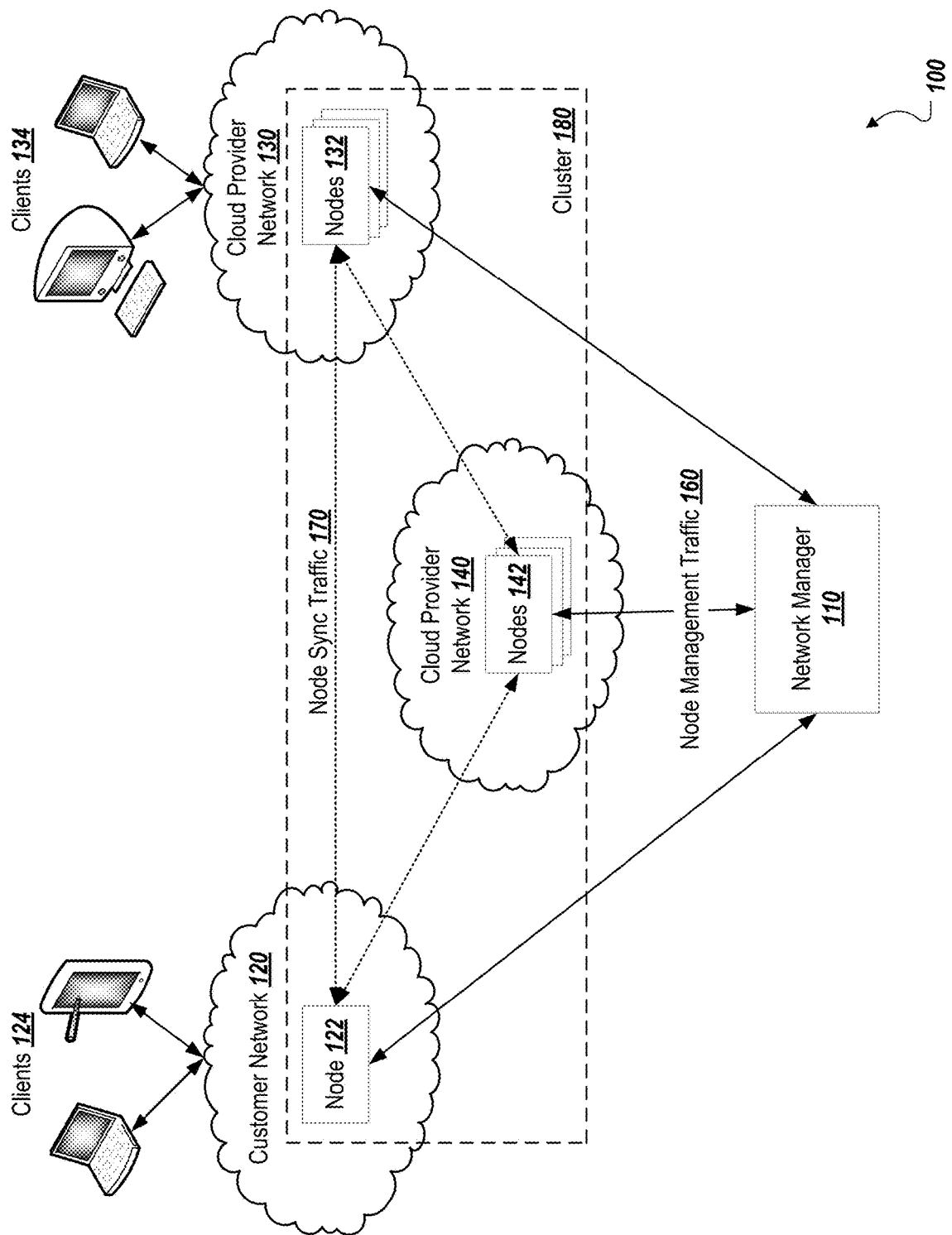
FIG. 1 is a block diagram of an example computer system for implementing and managing a hybrid cloud computing network.

Cloud service providers provide the ability for customers to implement distributed applications without having to manage any physical hardware components themselves. Such cloud computing networks may allow customers to allocate and deallocate virtual processing resources (virtual nodes), such as virtual machine instances, operating-system-level virtual instances in frameworks like DOCKER, etc., programmatically using an application programming interface (API). Examples of these kinds of systems include MICROSOFT AZURE, AMAZON WEB SERVICES (AWS), VERIZON CLOUD, and GOOGLE CLOUD. One limitation of these services is a lack of integration between the different offerings. For example, a virtual node running in MICROSOFT AZURE cannot interoperate with one running in AWS without significant application level logic implemented by the customer in the node itself. Similarly, virtual nodes running in one of these cloud systems cannot interoperate with physical computing devices (physical nodes) outside the cloud system, such as a physical computing device residing on a customer's private network. Such a limitation can lead to inefficiencies such as backhauling data from one cloud system to another so the data can be processed by an appropriate node.

The present application describes techniques for implementing and managing a hybrid cloud network that can include virtual nodes from multiple different cloud service providers, as well as physical or virtual nodes hosted on a customer's private network. The techniques described herein can be used to organize different types of virtual and physical processing resources hosted on different networks into a hybrid cloud computing network that seamlessly utilizes these processing resources. Also described herein is a synchronization technique by which the nodes of the hybrid cloud network synchronize data, state information, and configuration information between one another in a peer-to-peer fashion such that the central management component need only coordinate the connections between the nodes at the outset.

These techniques may provide several advantages. In cases where a customer's data is already running through the network of a particular cloud service provider, such as where the cloud service provider is also the customer's internet service provider (ISP), the present techniques allow the data to be processed by a node on the cloud service provider's network rather than being backhauled to a central server or other location outside of the provider's network for processing. Avoiding this data backhaul may reduce network costs and increase efficiency. Further, the ability to process the customer's data using a node at the cloud service provider may allow the customer's data to be segregated from the data of other customers for security purposes, rather than backhauled to a central location and processed by a shared resource. This may be accomplished spawning virtual nodes specifically for the particular customer, and configuring the nodes to only process network traffic for that particular customer.

The present approach may also offer the ability to leverage globally available cloud infrastructure to service mobile users as they travel abroad, and may improve speed and performance by servicing remote users using a cloud node that is geographically nearby. In addition, the system may provide a configurable upgrade policy that allows even globally distributed organizations to control when upgrades occur in the cloud, including configuring on-demand upgrades and different upgrade schedules, depending on geographic location, FIG. 1 is a block diagram of an example computer system 100 for implementing and managing a hybrid cloud computing network. As shown the computer system 100 includes a network manager 110 connected with cloud provider networks 130 and 140, and a customer network 120. The network manager 110 is in communication with nodes 122, 132, and 142 located on the various networks as shown. Node management traffic 160 is transmitted between the network manger 110 and the nodes 122, 132, and 142. Node sync traffic 170 is transmitted between the nodes 122, 132, and 142. Clients 124, 134 are connected to the customer network 120 and the cloud service provider 130, as shown. Nodes 122, 132, and 142 are organized into cluster 180.

The network manager 110 oversees and manages the nodes 122, 132, 142 to coordinate them into a hybrid cloud network. As shown, two-way node management traffic 160 is exchanged between the network manager and the nodes 122, 132, 142. In some cases, this node management traffic may include initial configuration messages to initialize a new node (e.g., calls to the particular cloud provider's API) and configure it for processing. The node management traffic 160 may also include heartbeat message (e.g., status indications) from the nodes 122, 132, 142 indicating their current status. In some cases, such as a case where the network manager 110 is prevented from connecting to a particular node by a firewall, the network manager 110 may respond to a heartbeat sent by a particular node with configuration messages.

As shown, the network manager 110 groups the nodes 122, 132, 142 into cluster 180. A cluster is a grouping of nodes that are configured identically and are of the same type (different node types are discussed below). The nodes in the cluster 180 communicate with one another to synchronize various data, such as configuration data, usage data, analysis results data, program quarantine data, and other types of data. This synchronization process is discussed in greater detail in the description of FIG. 2 below.

In some cases, the nodes 122, 132, and 142 may analyze the network traffic received from clients (e.g., 124, 134), and forward the traffic onto the intended destination, such as a website or other resource on the Internet. The network traffic received from the clients 124, 134 may include traffic using different communications protocols, such as, for example, Hypertext Transfer Protocol (HTTP), Domain Name System (DNS) protocol, File Transfer Protocol (FTP), or other protocols. In some cases, the nodes 122, 132, and 142 may also receive and process network traffic sent from resources on the external network to the clients 124, 134, such as webpages, files, or other data sent from servers on the Internet in response to requests by the clients.

In some cases, the network traffic sent from the clients 124, 134 to the cloud provider 130 and the customer network 120 may be encrypted, such as, for example, using Hypertext Transfer Protocol Secure (HTTPS), Internet Protocol Security (IPSec) tunnels or other Virtual Private Network (VPN) techniques, Layer 2 Medium Access Control (MAC) Address redirection, Generic Routing Encapsulation (GRE), Web Cache Communication Protocol (WCCP), or other techniques. In some cases, the clients 124, 134 may include a software agent executing locally to forward the network traffic to the appropriate network. The cloud provider network 130 and the customer network 120 may also receive a copy or mirror of the network traffic from the clients 124, 134 for processing.

Each of the cloud provider networks 130, 140 and the customer network 120 may be a globally or regionally distributed network, with the nodes and other components of the system located across different geographic areas and connected by high-speed communications networks, such as, for example, optical networks, wireless networks, satellite networks, or other types of networks. In some cases, the components may be connected at least partially over the Internet. The networks connecting the components may utilize different protocols or technologies at different layers in the Open Systems Interconnection (OSI) model, including but not limited to Ethernet, Asynchronous Transfer Mode (ATM), Synchronous Optical Networking (SONET), Internet Protocol (IP), Transmission Control Protocol (TCP), or Universal Datagram Protocol (UDP). The components of the cloud system 100 may communicate over these networks using application layer communications protocols, such as, for example, HTTP, FTP, Simple Object Access Protocol (SOAP), Remote Procedure Call (RPC), or using other proprietary or public protocols for application programming interfaces (APIs).

The clients 124, 134 may be computing devices such as PCs, laptops, tablets, telephones, servers, routers, storage devices or other network enabled computing devices. The clients 124, 134 may be computing devices owned or controlled by the customer or and cloud provider, respectively, and may be used by employees of each. In some cases, the clients 124, 134 may not be owned or controlled by the customers, such as in the case the network is a bring your own device (BYOD) network, or an access network such as an Internet service provider (ISP) network.

The system 100 includes nodes 122, 132, 142. As described above, nodes are resources within the system 100 configured to process data, such as network traffic received from clients 124, 134. The system 100 may include different types of nodes, such as, for example, web security nodes, reporting nodes, and sandbox nodes. The different types of nodes within the system 100 may be configured to perform different functions.

For example, web security nodes may be configured to analyze received network traffic and apply network policies to the traffic, such as by selectively blocking, allowing, filtering, or performing other actions on the traffic based on the configuration attribute set by the particular customer to which the particular node is assigned. For example, web security nodes may filter requests for content from the clients 124, 134, and/or content sent from external resources to the clients 124, 134. Content matching certain parameters specified by the customer may be filtered, such as, for example, requests to certain domain names or Universal Resource Locators (URLs), requests for or responses including specific file types, traffic formatted according to certain protocols, traffic from certain users or clients, or other parameters. The web security nodes may also identify and log (e.g., store with a reporting node) particular network events, including actual or suspected malware intrusions, actual or suspected network breaches, visits by clients to malicious, unsafe, or inappropriate websites, downloads of malicious, unapproved, or unlicensed software by clients, or other events. The web security nodes may also identify and store behavioral data, such as client or user network activity, network flows, or other data. In some cases, the web security nodes may be configured to provide proxy service to clients of an assigned customer by forwarding requests received from the clients to appropriate external resources, and forwarding responses from the resources back to the clients. Such forwarding may be selective based on the filtering functionality discussed above.

Reporting nodes may be configured to store network traffic and/or results of analysis by other nodes, and to produce reports based on the stored data for presentation to users or administrators of the system 100. The reports may include, but are not limited to, drill down reports allowing network activity to be viewed at both specific and high levels, event logs showing network traffic or other events matching particular criteria, real-time dashboards providing views of the current state of a customer's network traffic, incident response dashboards for monitoring issues with the customers network traffic, and other reports.

Sandbox nodes may be configured to execute malicious or potentially malicious software programs in a virtual environment to allow the behavior of the programs to be analyzed without adverse effects to other computing devices external to the sandbox. In some cases, the malicious software programs may be identified by a web security node such as in a response from an external resource to request from a client. In addition to blocking the download of the malicious software program, the web security node may provide the identified malicious software program to sandbox node for execution and analysis.

The system 100 may include other types of nodes. A risk assessment node may calculate a risk score for identified security events (e.g., intrusions, data exfiltration, denial of service attacks, or other events) in order to allow prioritization of the events based on a level of risk, which may facilitate planning of a remedy or response by the effected organization. For example, the risk assessment node may assign a higher risk score to a data exfiltration involving malicious removal of sensitive data from customer network 120, and assign a lower risk score to an intrusion on the customer network 120 that did not access any sensitive data. Such a risk score may be generated based on network traffic received from the clients 124, or based on data generated or stored by other nodes in the system 100.

A log indexer node may organize data stored by a reporting node in a specific way to allow it to be accessed quickly, such as by another node within the system 100, or by a user or administrator of the cloud system 100 through a user interface.

As previously discussed, the nodes of the system 100 may be physical computing devices (physical nodes) or virtual machine instances within a virtual machine environments executed by physical computing devices (virtual nodes). A virtual node may also be a containerized program executing an operating-system-level virtualization architecture such as DOCKER. The system 100 may include both physical nodes and virtual nodes.

Figure 2:
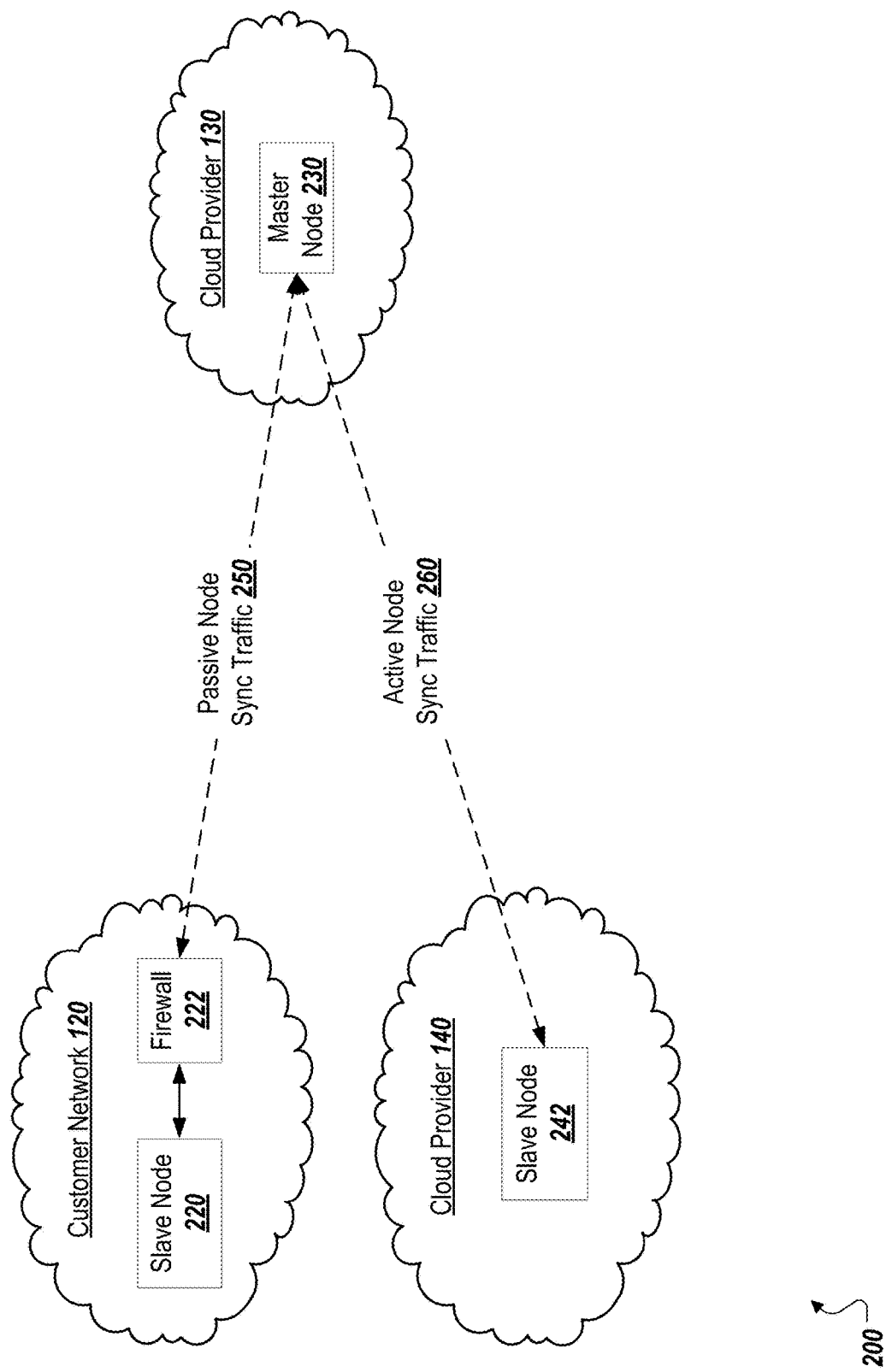
FIG. 2 is a block diagram of an example computer system for synchronizing data between different nodes of the hybrid cloud computing network.

FIG. 2 is a block diagram of an example computer system 200 for synchronizing data between different nodes of the hybrid cloud computing network. As shown, the passive node sync traffic 250 is exchanged between master node 230 and the slave node 220 via the firewall 222. Active node sync traffic 260 is exchanged between the slave node 242 and the master node 230. In some cases, the slave nodes 220 and 242 may also exchange passive node sync traffic between one another.

The master node 230 ensures that data that needs to be synchronized is kept up to date on all nodes in a cluster. In some cases, the master node 230 may be designated by the network manager 110. The master node 230 may also be chosen by the nodes of a cluster themselves, such as by random or pseudo-random selection or based on an objective criteria such as average network latency. The master node 230 may be either a virtual or physical node and can reside in any of the cloud provider and customer networks that make up the system 100.

As shown, the passive node sync traffic 250 is exchanged between master node 230 and the slave node 220 via the firewall 222. This passive exchange involves the slave node first sending an outbound request to the master node 230. Because the slave node 220 has initiated the connection to master node 230, the firewall 222 will, in most cases, allow a response from master node 230 to reach slave node 220. Firewalls are generally configured to block unsolicited connections from external devices unless a specific rule is configured to allow them (e.g., on a particular port). Thus, this passive synchronization mechanism allows the node synchronization to take place even if a firewall is present. In some cases, the network manager 110 may analyze network traffic (e.g., heartbeats) received from the slave node 220 (or other information) to determine that the slave node 220 is behind a firewall. In such a case, the network manager 110 will configure the slave node 220 to utilize passive node synchronization, and configure all other nodes to communicate with slave node 220 in this way. For a node that is not behind a firewall (e.g., slave node 242), the network manager 110 will configure the node for active node synchronization in which other nodes can freely connect to the node in order to synchronize.

Figure 3:
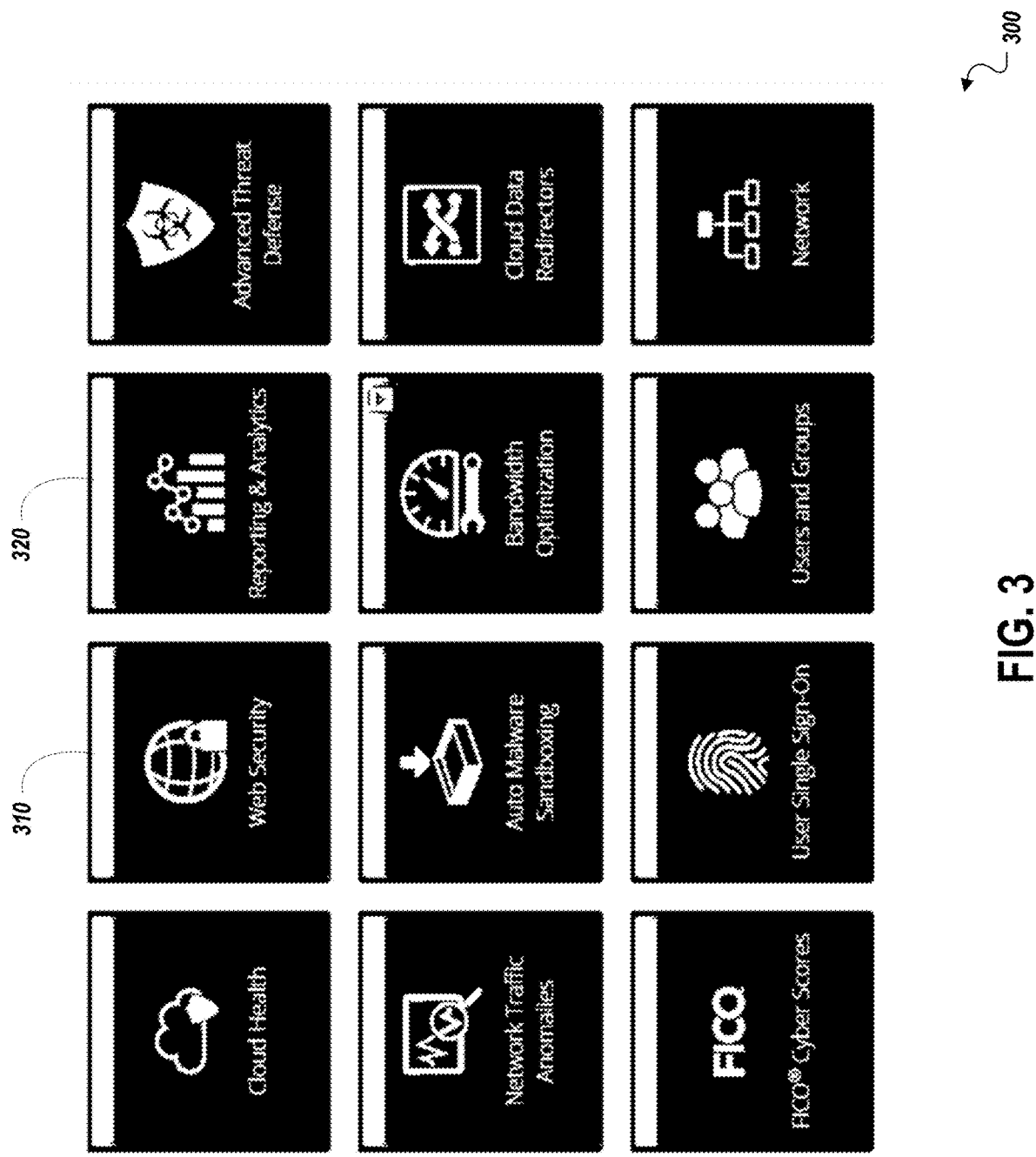
FIG. 3 is an example user interface for configuring various features of the hybrid cloud computing network.

FIG. 3 is an example user interface 300 for configuring various features of the hybrid cloud computing network. The user interface 300 may be presented to a user, such as through a web browser, and may receive input from the user, for example in the form of keystrokes or mouse clicks. The user interface 300 includes an array of visual tiles (e.g., 310, 320) each associated with the particular function of the cloud computing system. Before accessing user interface 300, the user may have provided login credentials to a multi-tenant authentication system, and a system that presents the user interface 300 may itself be multi-tenant. When the user activates one of the visual tiles, a request to a node associated with the particular function denoted by the tile is generated. This request is sent to a single-tenant node assigned to the customer with which the user is associated. The single-tenant node may respond with a subsequent user interface (e.g., a webpage to be rendered in the user's browser) allowing the user to access or change data associated with the particular customer. For example, when a user associated with a customer A clicks on the web security tile 310, a request may be sent to a web security node assigned to customer A. The web security node may respond to the user with a webpage including configuration or other data associated with customer A. If a user from another customer clicks on the web security tile 310, a request would be generated to a different web security node associated with that customer. In this way, a global, multi-tenant user interface may be implemented to service multiple customers of the cloud computing system, while requests involving customer data are still handled by single-tenant nodes dedicated to that particular customer.

Figure 4:
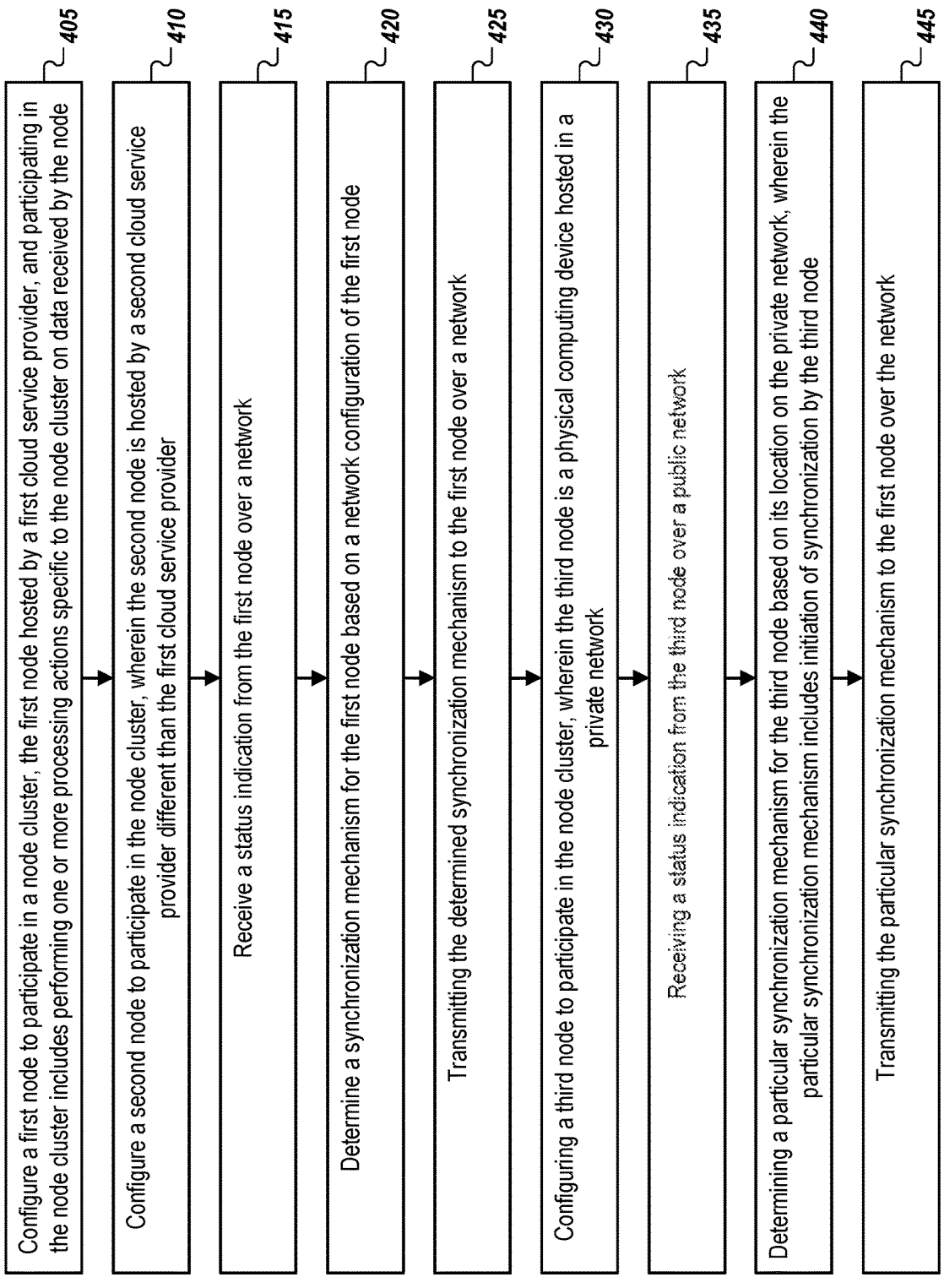
FIG. 4 is a flow chart showing a process for implementing and managing a hybrid cloud computing network.

FIG. 4 is a flow chart showing a process 400 for implementing and managing a hybrid cloud computing network. At 405, a first node is configured to participate in a node cluster, wherein the first node is hosted by a first cloud service provider, and wherein participating in the node cluster includes performing one or more processing actions specific to the node cluster on data received by the node. In some cases, the first node is a virtual machine instance, and configuring the first node includes calling an application programming interface (API) provided by the first cloud service provider to create the virtual machine instance. In some implementations, the one or more processing actions specific to the node cluster may include performing threat analysis and selectively performing corrective action in response to receiving network traffic from a network client.

In some implementations, the network client is a client of the first cloud service provider, and the first node is configured to perform threat analysis and selectively perform corrective action on network traffic received from the network client. In some cases, the network client is a client of the second cloud service provider, and the second node is configured to perform threat analysis and selectively perform corrective action on network traffic received from the network client. In some cases, threat analysis may include analyzing traffic sent and received by the network client for patterns indicative of viruses or malware, executing downloaded programs in a sandbox environment, or other types of analysis. In some cases, corrective action may include blocking a request form the client, blocking a response to the client, disconnecting the client from the network, performing a virus scan on the client, or other corrective actions.

In some cases, a third node is configured to participate in the node cluster, and the third node is a physical computing device hosted in a private network. In some implementations a status indication from the third node over the public network. In response to receiving the status indication, a passive synchronization mechanism is determined for the third node based on its location on a private network. In response to determining the passive synchronization mechanism, the passive synchronization mechanism is transmitted to the first node over the network. In some cases, the passive synchronization mechanism is configured to allow the third node to obtain synchronization information from other nodes in the cluster without accepting inbound connections from the public network At 410, a second node is configured to participate in the node cluster, wherein the second node is hosted by a second cloud service provider different than the first cloud service provider. At 415, a status indication is received from the first node over a network. At 420, in response to receiving the status indication, a synchronization mechanism is determined for the first node based on a network configuration of the first node, wherein the determined synchronization mechanism is configured to allow the first node to acquire synchronization data from other nodes in the node cluster. At 425, in response to determining the synchronization mechanism, the determined synchronization mechanism is transmitted to the first node over the network. At 430, a third node is configured to participate in the node cluster, wherein the third node is a physical computing device hosted in a private network. At 435, a status indication is received from the third node over a public network. At 440, a particular synchronization mechanism is determined for the third node based on its location on the private network, wherein the particular synchronization mechanism includes initiation of synchronization by the third node. At 445, the particular synchronization mechanism is transmitted to the first node over the network.

Figure 5:
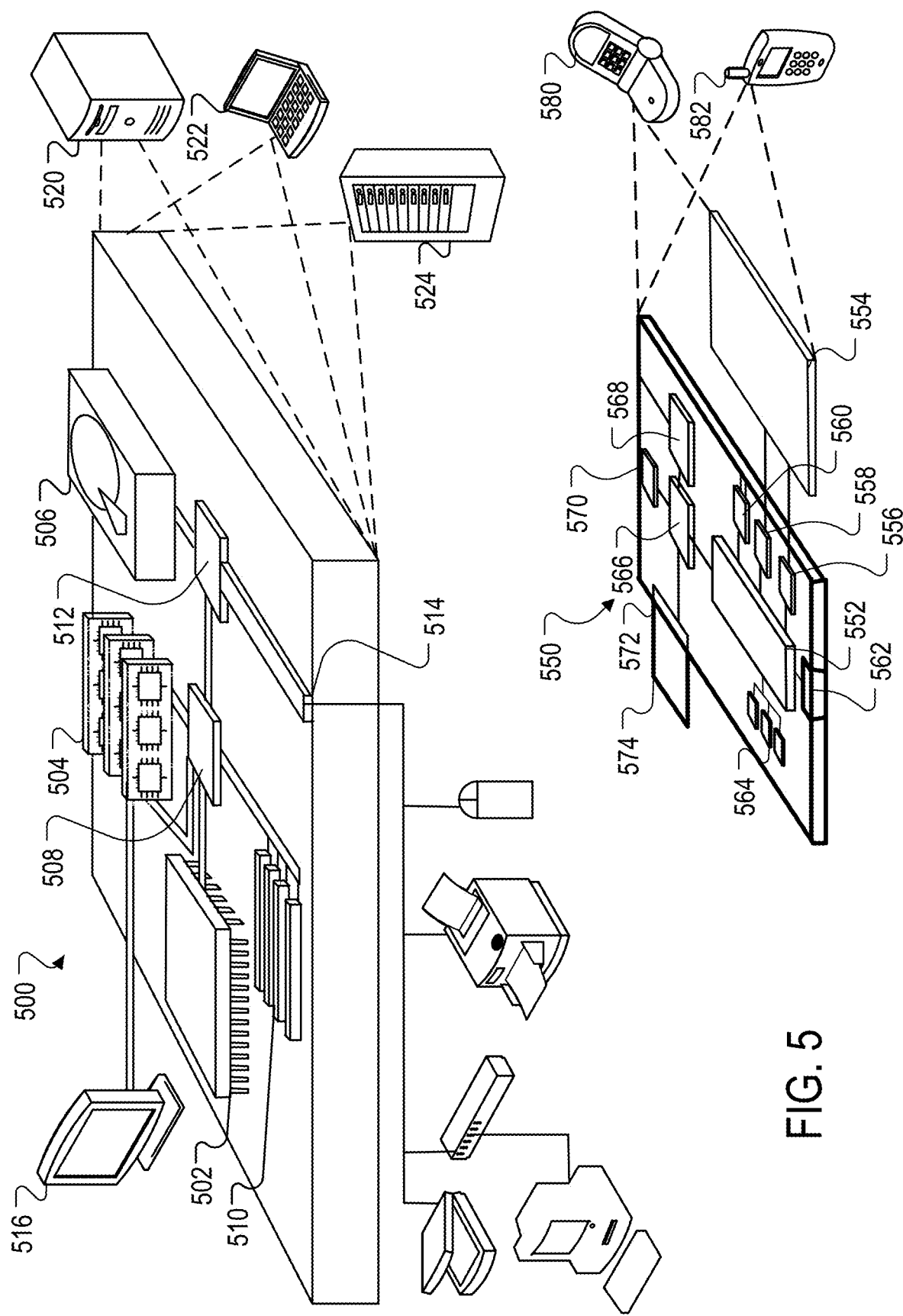
FIG. 5 is a block diagram of computing devices that may be used to implement the systems and methods described herein.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a ITT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SWIM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:
What is claimed is:

1. A computer-implemented method executed by one or more processors comprising:
    configuring, by the one or more processors, a first node to participate in a node cluster, wherein the first node is hosted by a first cloud service provider, and wherein participating in the node cluster includes performing one or more processing actions specific to the node cluster on data received by the node;
    configuring, by the one or more processors, a second node to participate in the node cluster, wherein the second node is hosted by a second cloud service provider different than the first cloud service provider;
    receiving, by the one or more processors, a status indication from the first node over a network that is a public network;
    in response to receiving the status indication, determining, by the one or more processors, a synchronization mechanism for the first node based on a network configuration of the first node, wherein the determined synchronization mechanism is configured to allow the first node to acquire synchronization data from other nodes in the node cluster;
    in response to determining the synchronization mechanism, transmitting, by the one or more processors, the determined synchronization mechanism to the first node over the network;
    configuring, by the one or more processors, a third node to participate in the node cluster, wherein the third node is a physical computing device hosted in a private network;
    receiving, by the one or more processors, a status indication from the third node over the public network;
    in response to receiving the status indication, determining a particular synchronization mechanism for the third node based on its location on the private network, wherein the particular synchronization mechanism includes initiation of synchronization by the third node; and
    in response to determining the particular synchronization mechanism, transmitting the particular synchronization mechanism to the first node over the network.

2. The method of claim 1, wherein the first node is a virtual machine instance, and configuring the first node includes calling an application programming interface (API) provided by the first cloud service provider to create the virtual machine instance.

3. The method of claim 1, wherein the particular synchronization mechanism is configured to allow the third node to obtain synchronization information from other nodes in the cluster without accepting inbound connections from the public network.

4. The method of claim 1, wherein the one or more processing actions specific to the node cluster include performing threat analysis and selectively performing corrective action in response to receiving network traffic from a network client.

5. The method of claim 4, wherein the network client is a client of the first cloud service provider, and wherein the first node is configured to perform threat analysis and selectively perform corrective action on network traffic received from the network client.

6. The method of claim 4, wherein the network client is a client of the second cloud service provider, and wherein the second node is configured to perform threat analysis and selectively perform corrective action on network traffic received from the network client.

7. The method of claim 1, wherein the initiation of synchronization by the third node passes through a firewall configured to permit the initiation of synchronization by the third node and to block initiation of synchronization by the one or more processors.

8. A non-transitory, computer-readable medium storing instructions operable when executed to cause at least one processor to perform operations comprising:
    configuring, by the one or more processors, a first node to participate in a node cluster, wherein the first node is hosted by a first cloud service provider, and wherein participating in the node cluster includes performing one or more processing actions specific to the node cluster on data received by the node;
    configuring, by the one or more processors, a second node to participate in the node cluster, wherein the second node is hosted by a second cloud service provider different than the first cloud service provider;

receiving, by the one or more processors, a status indication from the first node over a network that is a public network;

in response to receiving the status indication, determining, by the one or more processors, a synchronization mechanism for the first node based on a network configuration of the first node, wherein the determined synchronization mechanism is configured to allow the first node to acquire synchronization data from other nodes in the node cluster;

in response to determining the synchronization mechanism, transmitting, by the one or more processors, the determined synchronization mechanism to the first node over the network;

configuring, by the one or more processors, a third node to participate in the node cluster, wherein the third node is a physical computing device hosted in a private network;

receiving, by the one or more processors, a status indication from the third node over the public network;

receiving, by the one or more processors, a status indication from the third node over the public network;

in response to receiving the status indication, determining a particular synchronization mechanism for the third node based on its location on the private network, wherein the particular synchronization mechanism includes initiation of synchronization by the third node; and in response to determining the particular synchronization mechanism, transmitting the particular synchronization mechanism to the first node over the network.

9. The non-transitory, computer-readable medium of claim 8, wherein the first node is a virtual machine instance, and configuring the first node includes calling an application programming interface (API) provided by the first cloud service provider to create the virtual machine instance.

10. The non-transitory, computer-readable medium of claim 8, wherein the particular synchronization mechanism is configured to allow the third node to obtain synchronization information from other nodes in the cluster without accepting inbound connections from the public network.

11. The non-transitory, computer-readable medium of claim 8, wherein the one or more processing actions specific to the node cluster include performing threat analysis and selectively performing corrective action in response to receiving network traffic from a network client.

12. The non-transitory, computer-readable medium of claim 11, wherein the network client is a client of the first cloud service provider, and wherein the first node is configured to perform threat analysis and selectively perform corrective action on network traffic received from the network client.

13. The non-transitory, computer-readable medium of claim 11, wherein the network client is a client of the second cloud service provider, and wherein the second node is configured to perform threat analysis and selectively perform corrective action on network traffic received from the network client.

14. The non-transitory, computer-readable medium of claim 8, wherein the initiation of synchronization by the third node passes through a firewall configured to permit the initiation of synchronization by the third node and to block initiation of synchronization by the one or more processors.

15. A system comprising:

non-transitory memory for storing data; and one or more processors operable to perform operations comprising:

configuring, by the one or more processors, a first node to participate in a node cluster, wherein the first node is hosted by a first cloud service provider, and wherein participating in the node cluster includes performing one or more processing actions specific to the node cluster on data received by the node;

configuring, by the one or more processors, a second node to participate in the node cluster, wherein the second node is hosted by a second cloud service provider different than the first cloud service provider;

receiving, by the one or more processors, a status indication from the first node over a network that is a public network;

in response to receiving the status indication, determining, by the one or more processors, a synchronization mechanism for the first node based on a network configuration of the first node, wherein the determined synchronization mechanism is configured to allow the first node to acquire synchronization data from other nodes in the node cluster;

in response to determining the synchronization mechanism, transmitting, by the one or more processors, the determined synchronization mechanism to the first node over the network;

configuring, by the one or more processors, a third node to participate in the node cluster, wherein the third node is a physical computing device hosted in a private network;

receiving, by the one or more processors, a status indication from the third node over the public network;

in response to receiving the status indication, determining a particular synchronization mechanism for the third node based on its location on the private network, wherein the particular synchronization mechanism includes initiation of synchronization by the third node; and in response to determining the particular synchronization mechanism, transmitting the particular synchronization mechanism to the first node over the network.

16. The system of claim 15, wherein the first node is a virtual machine instance, and configuring the first node includes calling an application programming interface (API) provided by the first cloud service provider to create the virtual machine instance.

17. The system of claim 15, wherein the initiation of synchronization by the third node passes through a firewall configured to permit the initiation of synchronization by the third node and to block initiation of synchronization by the one or more processors.

* * * * *